United States Patent [19]

Tanaka et al.

[11] Patent Number: 5,079,102
[45] Date of Patent: Jan. 7, 1992

[54] TOOL USING GOLD AS A BINDER

[75] Inventors: Katsuyuki Tanaka; Yoshiaki Kumazawa; Nobuo Urakawa, all of Itami, Japan

[73] Assignee: Sumitomo Electric Industries, Ltd., Osaka, Japan

[21] Appl. No.: 552,689

[22] Filed: Jul. 12, 1990

[30] Foreign Application Priority Data

Jul. 14, 1989 [JP] Japan .................................. 1-180550

[51] Int. Cl.⁵ .............................................. B32B 15/04
[52] U.S. Cl. .................................... 428/627; 428/634; 428/656; 428/672
[58] Field of Search ............... 428/621, 623, 627, 634, 428/656, 670, 672

[56] References Cited

U.S. PATENT DOCUMENTS

| | | | |
|---|---|---|---|
| 3,192,620 | 7/1965 | Huizing et al. | 428/634 |
| 3,555,667 | 1/1971 | Carlson et al. | 428/672 |
| 3,856,480 | 12/1974 | Johnson et al. | 428/672 |
| 4,929,516 | 5/1990 | Pryor et al. | 428/670 |
| 5,002,828 | 3/1991 | Cerceau | 428/627 |

OTHER PUBLICATIONS

IBM Technical Disclosure Bulletin, Cuomo, J. J. et al., "Method for Bonding to Diamond Surface", Sep. 1969.

Primary Examiner—R. Dean
Assistant Examiner—George Wyszomierski
Attorney, Agent, or Firm—Wenderoth, Lind & Ponack

[57] ABSTRACT

A tool comprising a blank and shank, bonded at a low temperature through a bonding layer of gold formed by thermocompression bonding between the blank and shank is provided which can be used at a high temperature independently of the temperature at which the blank and shank were bonded.

4 Claims, 2 Drawing Sheets

TOOL USING GOLD AS A BINDER

BACKGROUND OF THE INVENTION

1. Field of the Invention

This invention relates to a tool comprising a blank and shank, bonded by thermocompression bonding, in particular, using gold as a bonding material, and a process for the production of the same. Such a tool is suitable for use as a bonding tool for tape automated bonding.

2. Description of Prior Art

As the prior art for the production of a tool comprising a blank and shank, there have been often used methods comprising brazing a blank consisting of, for example, cemented carbides, polycrystalline diamond, single crystal diamond, polycrystalline cBN, substrates consisting of sintered compacts containing one of Si, $Si_3N_4$, SiC and AlN, as a main component, and/or composites thereof, coated with polycrystalline diamond by gaseous phase synthesis method (i.e. CVD diamond), etc. to a shank consisting of, for example, ferrous metals, nickel metals, cemented carbides, tungsten alloys, etc. with various brazing metals, for example, silver-type, gold-type, aluminum alloy-type, nickel type brazing metals, comprising sintering and bonding using a sintering metal and comprising mechanically fixing.

In the brazing method of the above-described bonding methods, it is required to use a brazing metal having a melting point, of at least 300° C. higher than the temperature at which the tool is used, from the standpoint of ensuring the bonding strength. Thus, there arises a problem that when using, as the blank, single crystal diamond, polycrystalline diamond or polycrystalline cBN, which tends to be deteriorated at 600 to 800° C., in a tool to be used at 600° C., for example, the use of a brazing metal having a melting point of 900° C. or higher for bonding the blank with a shank, so as to ensure the bonding strength, results in deterioration of the blank of diamond or cBN during bonding, while the use of another brazing metal having a melting point of 600 to 800° C., so as to prevent the blank from deterioration, results in that the bonding strength cannot be maintained during use of the tool at 600° C.

In the sintering bonding method or mechanical bonding method, it is hard to bond a small-sized blank and thus it is required to secure a large-sized blank so as to render bonding well feasible.

SUMMARY OF THE INVENTION

It is an object of the present invention to provide a tool comprising a blank and shank, bonded at a low temperature, which can be used at a high temperature independently of the temperature at which the blank and shank were bonded.

It is another object of the present invention to provide a tool of such a type as to bond a blank to a shank, with an improved reliability at a high temperature.

It is a further object of the present invention to provide a process for the production of a tool comprising, a blank and shank, wherein the blank would otherwise be thermally deteriorated during brazing.

These objects can be attained by a tool comprising a blank and shank, having a bonding layer of gold formed by thermocompression bonding between the blank and shank.

BRIEF DESCRIPTION OF THE DRAWINGS

The accompanying drawings illustrate in detail the principle and merits of the present invention.

DETAILED DESCRIPTION OF THE INVENTION

The inventors have made various efforts to solve the problems of the prior art, as described above, and consequently, have found that an tool is effective tool comprises a blank and shank, bonded by a thermocompression bonding method using gold as a bonding material. Accordingly, the present invention provides a tool comprising a blank and shank, bonded through a bonding layer of gold formed by thermocompression between the blank and shank.

In a particularly preferred embodiment of the tool of the present invention, the blank and/or shank has, as a base layer, a bond-strengthening layer and/or diffusion proof layer. For example, the blank and shank each have, as the first layer, bond-strengthening layers and diffusion proof layers outside the bond-strengthening layers and further have a bonding layer consisting of gold formed by thermocompression bonding between the diffusion proof layer of the blank and the diffusion proof layer of the shank.

Furthermore, the present invention provides a process for the production of the above described tool of the present invention by bonding a blank and shank, which comprises coating the surfaces of the blank and shank, to be bonded to each other, with gold as an outermost layer, allowing the coated gold layers to face each other, optionally inserting a thin gold sheet therebetween and then subjecting them to thermocompression bonding.

Figure 1A:
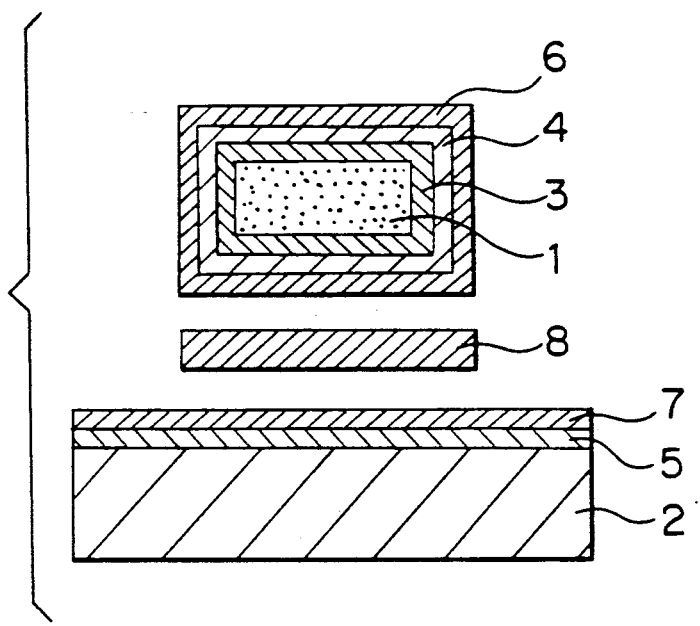
FIG. 1(a) and (b) are cross-sectional views of one embodiment of the tool of the present invention and the process for the production of the same, (a) showing the state of a blank and shank before bonding and (b) showing that of the blank and shank bonded through combination of golds 6, 7 and 8.

The present invention will now be illustrated in detail with reference to the accompanying drawings:

FIG. 1(a) and (b) are cross-sectional views which illustrate the bonding of a blank 1 and shank 2. The blank 1 is first provided with a bond-strengthening layer 3 consisting of a metal capable of readily forming a compound with the blank for the purpose of ensuring a sufficient bonding strength between the blank and coating. As the blank, for example, there are used single crystal diamond, polycrystalline diamond, polycrystalline cBN, aluminum nitrade, beryllia, substrates consisting of sintered compacts containing one of Si, $Si_3N_4$, SiC and AlN, as a main component, and/or composites thereof, coated with polycrystalline diamond by gaseous phase synthesis method (i.e. CVD diamond) and the like, during which it is preferable to use materials capable of forming oxides, carbides or nitrides with the blank, for example, at least one of titanium (Ti), chromium (Cr), manganese (Mn), vanadium (V), zirconium (Zr) and the like as the bond-strengthening layer.

The thickness of the bond-strengthening layer is generally in the range of 100 to 10000Å which is specified from the standpoint of ensuring the bonding strength and from an economical point of view of the material.

On the bond-strengthening layer 3 is provided a diffusion proof layer 4 to prevent the metallic elements of the bond-strengthening layer 3, for example, Ti, Cr, Mn, V, Zr, etc. from diffusing in and alloying with a gold layer. Therefore, the diffusion proof layer 4 is preferably made of a high melting point metal that, is hardly alloyed with gold, for example, at least one of platinum (Pt), palladium (Pd), tungsten (W), molybdenum (Mo), tantalum (Ta), nickel (Ni) and the like, and has preferably a thickness of 100 to 5000Å which is specified from the standpoint of the diffusion proof effect and economy of the material.

The foregoing bond-strengthening layer 3 and diffusion proof layer 4 on the blank 1 can be formed in known manner, for example, by vapor deposition, sputtering, ion plating, electroless plating, electrolytic plating, etc.

On the other hand, the shank 2 is first provided with a diffusion proof layer 5 for preventing the metal of the shank from diffusing in a gold layer. As the shank 2, for example, there can be used tungsten-nickel alloys, tungsten-copper alloys, cemented carbides, nickel alloy, ferrous metals and the like, during which, for example, nickel (Ni) is used as the diffusion proof layer. Formation of the diffusion proof layer 5 of the shank 2 can also be carried out in known manner, for example, by vapor deposition, sputtering, ion plating methods, etc. The thickness of the diffusion proof layer 5 is preferably in the range of 100 to 5000Å for the same reasons as described above.

When the shank is also provided with a bond-strengthening layer, it is preferable to use Ti, Cr, Mn, V, Zr, etc. as the material thereof. The thickness of the bond-strengthening layer in this case is preferably in the range of 100 to 10000Å.

The surfaces of the diffusion proof layer 4 of the blank 1 and the diffusion proof layer 5 of the shank 2 are respectively coated with gold layers 6 and 7. These gold layers 6 and 7 are coated in known manner, for example, by vapor deposition, sputtering, ion plating, etc. to give a thickness of 0.5 to 8.0 $\mu$m. If the thickness is less than 0.5 $\mu$m, the compression bonding strength of gold is lowered, while even if more than, 8.0 $\mu$m, the effect of the gold layer is not increased with the increased cost of gold.

The resulting gold coatings 6 and 7 directly form a thermocompression bonding. That is, the blank 1 is provided with the bond-strengthening layer 3, diffusion proof layer 4 and gold coating 6 and the shank 2 is provided with the diffusion proof layer 5 and gold coating 7, between which a thin sheet 8 of gold is inserted. The thickness of the of the thin gold sheet 8 is preferably adjusted to 0.3 to 0.003 mm from the standpoint of the bonding strength and economy problems. When the thin gold sheet 8 has a Young's modulus of at most $12.0 \times 10^{11}$ dyn/cm, Sn, Si, Ge, Cu, Sb, etc. can be contained therein as impurities.

Figure 1B:
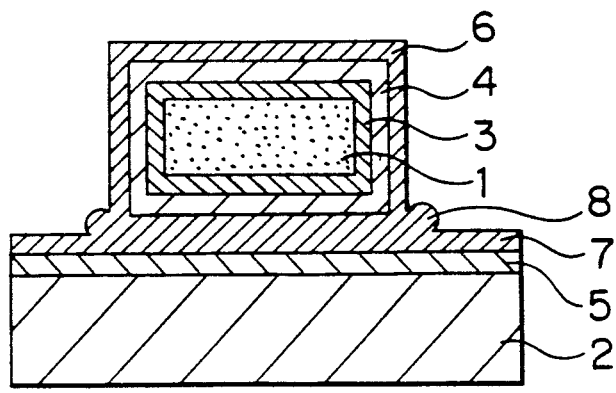

When the blank 1 and shank 2 are heated under this state and the gold layers 6, 7 and 8 are thus subjected to plastic deformation to bond the gold at the atomic level, the blank 1 and shank 2 are bonded as shown in FIG. 1(b). The conditions during the same time are preferably a pressure of 0.1 to 40 kg/mm² and a temperature of at least 100° C. which is lower than the heat resisting temperature of the material.

When the bonding pressure is higher, in general, the bonding strength is increased. However, if the bonding pressure is much higher, the shank tends to cause buckling or plastic deformation and the blank tends to break. Accordingly, the bonding pressure should preferably be in the above-described range. This bonding is independent of the bonding temperature and is resistant to use at a high temperature and moreover, it exhibits good conduction of heat because of being formed of only gold.

The gold coating layers can be thermocompression bonded to each other without inserting a thin sheet of gold, and the bond-strengthening layer or diffusion proof layer can be omitted.

The tool of the present invention can thus be obtained by thermocompression bonding the blank and shank with gold as a bonding material, as described above.

The gold coating layers 6 and 7 and the gold thin sheet 8 are compression heated to cause plastic deformation by heating and compressing under the state shown in FIG. 1(a). This plastic deformation results in breakage of an oxide film, or stain film on the surfaces of the gold 6, 7, and 8 to expose new surfaces of gold, during which the new exposed surfaces are adjacent to each other at the atomic level. Thus, bonding is formed among the golds 6, 7 and 8 through attraction among the gold atoms. That is, the golds 6, 7 and 8 are consolidated into one body because of the bonding formed among the gold atoms. Therefore, the bond does not slip is not slipped off even if heating at a high temperature during bonding and moreover, has good conduction of heat because of being composed of simple substance of gold.

In the tool of the present invention, the reliability of the gold thermocompression-bonded blank is enhanced by the presence of the bond-strengthening layer and in addition, the reliability at a high temperature is enhanced by the presence of the diffusion proof layer.

The following examples are given in order to illustrate the present invention in detail without limiting the same.

EXAMPLE 1

On the surface of a blank 10 mm square consisting of polycrystalline cBN (sintered compact) whose material property deteriorates at a temperature of 750° C. or higher, were coated, in order, three layers of a titanium layer (5000Å thick), a platinum layer (1 $\mu$m thick) and a gold layer (5 $\mu$m thick) as an outermost layer by ion plating under conditions of a pressure of $1 \times 10^{-3}$ Torr, substrate temperature of 200° C., coating speed of 10Å/sec and ionization voltage of 50 V. On the other hand, the surface of a shank consisting of a tungsten-nickel alloy was coated first with a nickel layer (1 $\mu$m thick) by electroless plating and then with a gold layer (5 $\mu$m thick) by electroplating. A thin sheet of 99.99% gold having a thickness of 0.05 mm was inserted in between the thus coated blank and shank, which were then heated at 500° C. while simultaneously compressing by a force of 500 kgf to effect thermocompression bonding thereof. Even when the tool prepared in this way, having a bonding strength of 10 kg/mm², was used at a high temperature, e.g. 600° C., no loosening occurred in the bonded blank.

EXAMPLE 2

The surface of a blank 15 mm square consisting of polycrystalline diamond (sintered compact) whose material property deteriorates at a temperature of 700° C. or higher, was coated with a chromium layer (2000Å thick) and a gold layer (3 μm thick) by sputtering under conditions of an argon pressure of $1 \times 10^{-3}$ Torr, substrate temperature of 200° C. and coating speed of 20Å/sec. On the other hand, the surface of a shank consisting of stainless steel (SUS 304) was coated with a nickel layer (3 mm thick), molybdenum layer (2000Å thick) and gold layer (3 mm thick) by ion plating under conditions of a pressure of $1 \times 10^{-3}$ Torr, substrate temperature of 150° C., coating speed of 50Å/sec and ionization voltage of 80 V. Then, the thus coated blank and shank were heated at 400° C. without inserting a thin sheet of gold in between the outermost layers of gold of the blank and shank, while simultaneously compressing by a force of 5000 kgf to effect thermocompression bonding thereof. Even when no diffusion proof layer was formed on the blank side, nor thin sheet of gold was inserted, as in this example, there could be obtained a tool having a bonding strength of 9.5 kg/mm² whose bonded part was not loosened even in use at a high temperature, e.g. 650° C., by controlling the thermocompression bonding conditions.

EXAMPLE 3

The surface of a blank 5 mm square consisting of single crystal diamond whose surface tends to be oxidized at 600° C. or higher was coated respectively with three layers of a titanium layer (600Å thick), molybdenum layer (1000Å thick) and gold layer (8 μm thick) as an outermost layer by sputtering under conditions of a pressure of $1 \times 10^{-4}$ Torr, substrate temperature of 280° C. and coating speed of 5Å/sec. On the other hand, the surface of a shank consisting of a cemented carbide was coated with a titanium layer (600Å thick), palladium layer (2000Å thick) and gold layer (8 μm thick) as an outermost layer by sputtering under conditions of a pressure of $1 \times 10^{-3}$ Torr, substrate temperature of 150° C. and coating speed of 15Å/sec. Then, a thin sheet of 99.99% gold having a thickness of 0.2 mm was inserted in between the thus coated outermost gold layers of the blank and shank, which were then heated at 500° C. while simultaneously compressing by a force of 50 kgf to effect thermocompression bonding thereof. By changing the thickness of the gold sheet inserted between the outermost layers in this way, there could be obtained a tool having a bonding strength of 9.8 kg/mm², even by such a lower force, whose bonded part was not loosened even in use at 580° C.

EXAMPLE 4

Figure 2A:
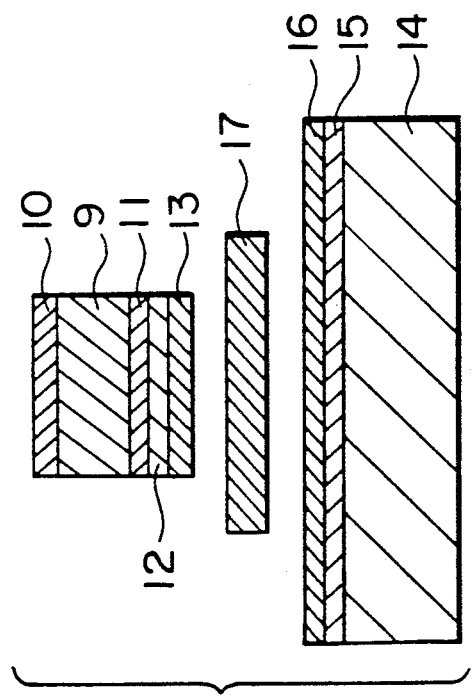
FIG. 2(a) and (b) are cross-sectional views of another embodiment of the tool of the present invention and a process for the production of the same, (a) showing the state of a blank and shank before bonding and (b) showing that of the blank and shank bonded through combination of golds 13, 16 and 17.
Figure 2B:
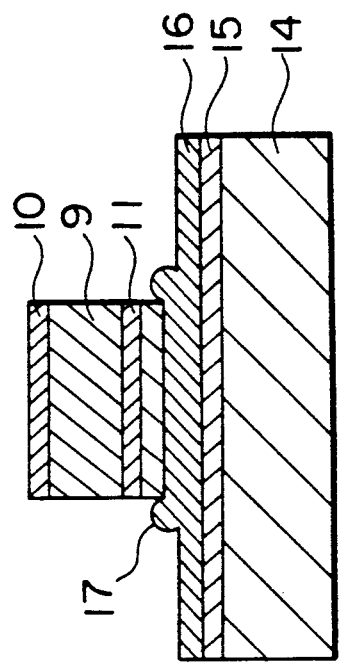

On the surface of a blank 14 mm square consisting of a sintered SiC compact substrate 9 coated with a polycrystalline diamond coating layer 10 having a thickness of 0.1 mm, as shown in FIG. 2, by a microwave plasma CVD method under the conditions of:
raw material gas (flow rate)
H₂: 200 cc/min
CH₄: 4 cc/min
Ar: 50 cc/min
pressure: 100 Torr
microwave output: 800 W
period of time: 10 hours
were coated, in order, three layers of a titanium layer 11 (1000Å thick), a platinum layer 12 (2000Å thick) and a gold layer 13 (3 μm thick) as an outermost layer by ion plating under conditions of a pressure of $1 \times 10^{-3}$ Torr, substrate temperature of 200° C., coating speed of 10Å/sec and ionization voltage of 50 V. On the other hand, the surface of a shank 14 consisting of an iron-nickel-cobalt alloy was coated first with a nickel layer 15 (1 μm thick) by electroless plating and then with a gold layer 16 (5 μm thick) by electroplating. A thin sheet 17 of 99.99% gold having a thickness of 0.2 mm was inserted in between the thus coated blank and shank, which were then heated at 700° C., while simultaneously compressing by a force of 300 kgf to effect thermocompression bonding thereof. Even when the tool prepared in this way, having a bonding strength of 12 kg/mm², was used at a high temperature, i.e. 600° C., no loosening occurred in the bonded blank.

In the tool of the present invention, as illustrated above, the blank and shank are bonded by plastic deformation of gold without using a brazing metal. Accordingly, such a problem does not arise that a brazing metal flows out of an area to be bonded during bonding as in the prior art bonding method with a brazing metal, and the tool of the present invention has advantages that it can be used at a higher temperature than the bonding temperature and the bonded area has a good conduction of heat.

Therefore, the production process of the present invention can favorably be applied to production of a tool, e.g. bonding tool for TAD, comprising a blank and shank, bonded with each other, said blank having such a lower heat resistance that it would tends to be thermally deteriorated during brazing.

We claim:

1. A bonding tool for tape automated bonding, comprising:
 a blank selected from the group consisting of single crystal diamond, polycrystalline diamond, polycrystalline cBN, aluminum nitride, beryllia, and a substrate consisting of a sintered compact containing at least one of Si, Si₃N₄, SiC and AlN as a main component coated with polycrystalline diamond by a gaseous phase synthesis method,
 a shank, and
 a bonding layer of gold formed by thermocompression between the blank and shank,
 wherein at least one of the blank and shank is provided with a bond-strengthening layer adhered thereto and a diffusion proof layer outside the bond-strengthening layer, the bond-strengthening layer being at least one member selected from the group consisting of titanium, chromium, vanadium, zirconium and manganese, the diffusion proof layer being at least one member selected from the group consisting of platinum, palladium, tungsten, molybdenum, tantalum and nickel.

2. The tool as claimed in claim 1, wherein the bond-strengthening layer has a thickness of 100 to 10000Å.

3. The tool as claimed in claim 1, wherein the diffusion proof layer has a thickness of 100 to 5000Å.

4. The tool as claimed in claim 1, wherein the shank is a member selected from the group consisting of a tungsten-nickel alloy, tungsten-copper alloy, cemented carbide, nickel alloy and or ferrous metal.

* * * * *